United States Patent [19]
Thompson

[11] 3,807,687
[45] Apr. 30, 1974

[54] AUTOMATIC DISCONNECT SHUT-OFF COUPLING FOR FLUID LINES

[76] Inventor: Arnold M. Thompson, Wheaton, Ill.

[22] Filed: Nov. 6, 1972

[21] Appl. No.: 304,338

[52] U.S. Cl. ............................ 251/149.4, 251/149.6
[51] Int. Cl. ............................................. F16l 37/28
[58] Field of Search............ 251/149.4, 149.6, 149.9

[56] References Cited
UNITED STATES PATENTS
3,339,883  9/1967  Drake .............................. 251/149.4
2,931,668  4/1960  Baley ........................... 251/149.4 X

*Primary Examiner*—William R. Cline

[57] ABSTRACT

A two-part separable coupling for the end-to-end connection of two fluid lines and including a valve-equipped part designed for application to the terminal end of a fluid pressure line and a valve actuator part designed for application to the proximate or inlet end of another fluid line which is to be operatively connected to the pressure line. The valve-equipped part of the coupling is in the form of a normally closed spring-biased shut-off valve and the valve actuator part serves, when coupled to the valve-equipped part, automatically to open the shut-off valve and establish free fluid communication between the two lines. When the two coupling parts are subsequently uncoupled or disconnected, the shut-off valve is restored automatically to its closed position thus preventing egress of fluid from the pressure line.

7 Claims, 4 Drawing Figures

PATENTED APR 30 1974 3,807,687
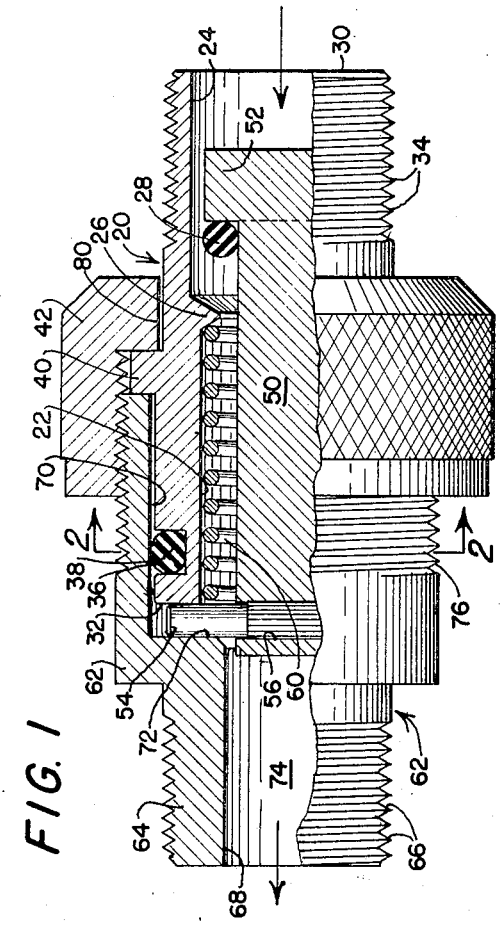
FIG. 1
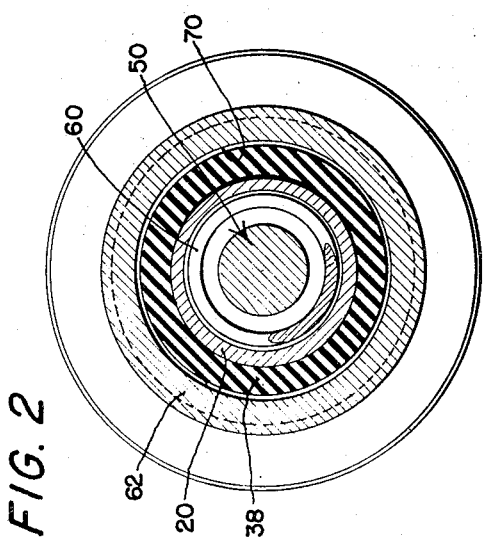
FIG. 2
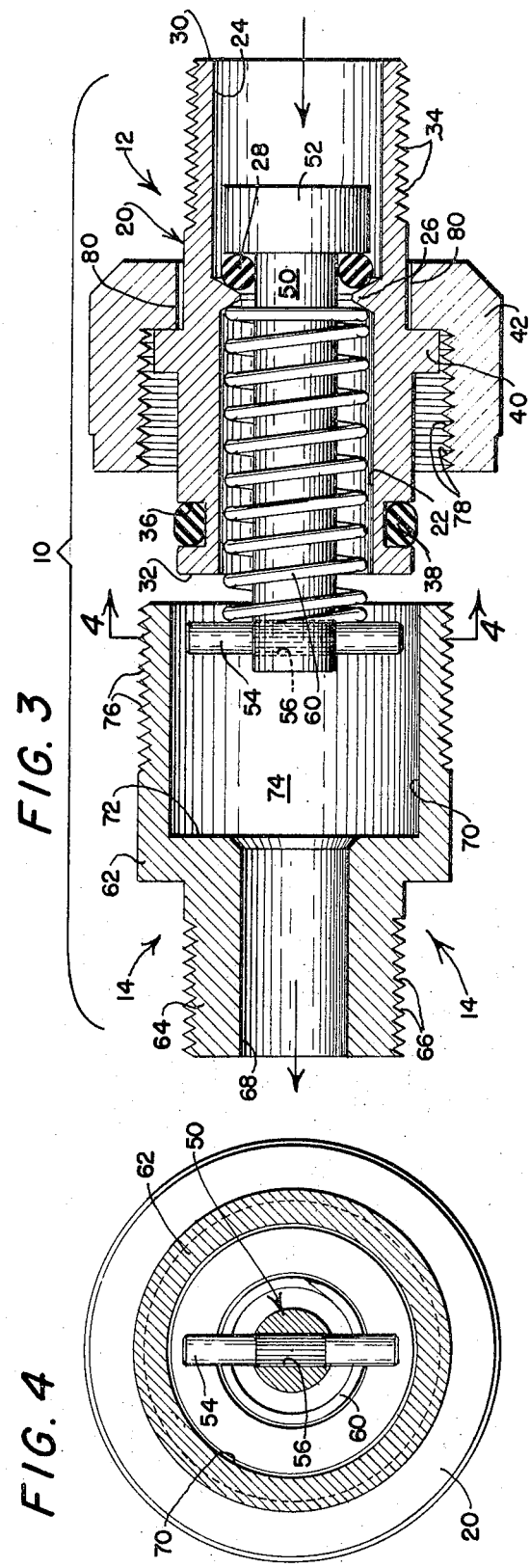
FIG. 3
FIG. 4

AUTOMATIC DISCONNECT SHUT-OFF COUPLING FOR FLUID LINES

The present invention relates generally to a two-part separable coupling for the adjacent ends of two fluid lines and is particularly concerned with a coupling of the general type which is commonly referred to as an automatic disconnect shut-off coupling by means of which a fluid pressure line is adapted to be removably connected to another fluid line in sealed fluid communicating relationship, such coupling being so designed and constructed that when the parts thereof are disconnected in order to separate the two lines, fluid pressure is automatically maintained and contained in the pressure line. Conversely, when the coupling parts are connected, fluid communication between the two lines is automatically established. Invariably, with a shut-off coupling of this general type, the coupling part which is connected to the pressure line embodies a normally closed valve which becomes open for fluid communicating purposes when the two parts of the coupling are engaged and becomes closed to contain the pressure fluid within such line when the parts of the coupling are disengaged.

Shut-off couplings of this general type are possessed of certain limitations, principal among which is the fact that during connection of the two coupling parts the fluid in the pressure line which is connected to the valve-equipped coupling part is not fully contained before the valve of such part commences to open thus there is an escape of fluid before the coupling is fully established or connected. A similar situation exists during uncoupling or disconnection of the coupling parts, the valve failing to become fully closed before the parts are completely separated. When pneumatic shut-off couplings are concerned, the noise and pressure of escaping air or other gaseous fluid are disconcerting to the operator or coupling manipulator and, where extremely high pressures are concerned, considerable force may be required to bring the two coupling parts to their final coupled or connected condition. Where liquid fluids are concerned, the indiscriminate spraying of fluid in the vicinity of the coupling is most undesirable. In either case, whether the coupling be pneumatic or hydraulic, a hazardous condition may exist in the case of flammable fluids or certain chemicals.

The present invention is designed to overcome the above noted limitation that is attendant upon the construction and use of conventional automatic disconnect shut-off couplings and, toward this end, the invention contemplates the provision of a novel automatic disconnect shut-off coupling which embodies the usual valve-equipped pressure line part and the valve actuator part and is characterized by the fact that the two parts are designed for releasable threaded connection to each other by a nipple fitting arrangement and are so constructed that during coupling or engagement the threaded engagement between the two parts becomes fully effective to contain the fluid within the pressure line before the valve structure of the valve-equipped part commences to open. Conversely, during uncoupling or disengagement of the parts the valve structure moves to its fully closed condition while the threaded engagement of the parts remains effective to contain the fluid so that during the final unthreading of the parts there is no fluid pressure in the vicinity of the co-acting or interfitting screw threads and consequently no spraying or escape of pressurized fluid.

The provision of an automatic disconnect shut-off coupling such as has briefly been outlined above, and possessing the stated advantages, constitutes the principal object of the present invention.

The provision of an automatic disconnect shut-off coupling which is extremely simple in its construction, effectively and efficiently fulfills its intended purpose, and is capable of being manufactured at a low cost constitutes another object of the invention.

Other objects and various advantages of the invention will be apparent from the consideration of the following detailed description.

The invention consists in the several novel features which are herein described and are more particularly defined by the claims at the conclusion hereof.

In the accompanying single sheet of drawings forming a part of this specification or disclosure, one illustrative embodiment of the invention is shown.

In these drawings:

FIG. 1 is a view partly in longitudinal section and partly in side elevation of an automatic disconnect shut-off coupling embodying the present invention, such view showing the parts of the coupling in their coupled or assembled condition;

FIG. 2 is a transverse sectional view taken on the line 2—2 of FIG. 1 and in the direction of the arrows;

FIG. 3 is a sectional view taken substantially centrally and longitudinally through the coupling and showing the component parts of the coupling in exploded fashion and also in their disengaged or uncoupled condition; and FIG. 4 is a transverse sectional view taken on the line 4—4 of FIG. 3.

Referring now to the drawings in detail, an automatic disconnect shut-off coupling embodying the present invention is designated in its entirety by the reference numeral 10 and it is comprised of two primary or principal components, namely, a valve-equipped part 12 and a valve actuator part 14, the first mentioned part being designed for more or less permanent attachment or connection to a fluid pressure line and the last mentioned part being designed for similar attacgment to an extension line which is to be releasably and operatively connected to such pressure line in fluid communication therewith. The fluid lines to which the parts 12 and 14 are adapted for connection have not been illustrated herein but it will be understood that the fluid pressure line to which the valve-equipped part 12 is adapted to be connected may be a fixed pipe section or the like, while the extension line to which the valve actuator part 14 is adapted to be connected ordinarily will be in the form of a flexible line such as a hose or similar conduit. For convenience of description herein, the aforementioned valve-equipped part 12 of the coupling 10 will be referred to simply as the pressure line part, while the valve actuator part 14 will be referred to as the extension line part. The extension line part 14 is in the form of a one-piece nipple fitting, while the pressure line part 12 is in the form of a self-contained composite valve assembly which has associated therewith a counterpart nipple fitting, the latter being designed for releasable attachment to the nipple fitting which comprises the extension line part 14.

Considering first the pressure line part 12, this part involves in its general organization an open-ended valve body or casing 20 which is of tubular construction and defines an internal bore 22 and a slightly enlarged counterbore 24. The bore 22 is formed in the left hand or discharge end of the casing 20 as viewed in FIGS. 1 and 3 and the counterbore is formed in the right hand or inlet end of the casing. An internal annular seating and sealing rib 26 separates the bore 22 and the counterbore 24 and is designed for cooperation with an elastomeric O-ring 28 in a manner and for a purpose that will be made clear presently.

The tubular valve casing 20 presents a circular rim 30 at the rear or inlet end thereof, such rim defining a fluid inlet for the casing. The circular rim 32 at the other or discharge end of the valve casing 20 defines a fluid outlet. The inlet end of the casing 20 of the pressure line part 12 is provided with an external screw thread 34 by means of which said pressure line part as a whole may be attached to an internally threaded nipple fitting (not shown) on the discharge end of the aforementioned fluid pressure line.

The valve casing 20 is formed with with an annular external groove 36 in the immediate vicinity of the rim 32, a second elastomeric O-ring 38 being disposed in such groove and serving a purpose that will be set forth presently. An outwardly extending integral annular flange 40 is formed on the valve casing 20 in the medial region thereof and cooperates with a nipple cap member 42 by means of which the pressure line part 12 is releasably coupled to the extension line part 14.

Slidable axially within the tubular casing 20 is an elongated generally cylindrical valve stem 50, one end (the right hand end as viewed in FIGS. 1 and 3) of which is formed with an enlarged head 52 and the other end of which is provided with a transversely extending abutment pin 54. The latter projects through and is press fitted or otherwise secured within a diametrically extending bore 56 in the valve stem 50, the ends of the pin being of such length that they overhand the cylindrical side surface of the valve stem an appreciable distance. The aforementioned elastomeric O-ring 28 immediately encompasses the valve stem 50 and is interposed between the enlarged head 52 and the internal rib 26 of the casing 20. A helical compression spring 60 surrounds the valve stem 50 and bears rearwardly at its right hand end against the annular rib 26. At its other end, the spring 60 bears forwardly against the overhanging end portions of the abutment pin 54.

From the description it will be readily apparent that the tendency of the spring 60 is yieldingly to urge the valve stem 50 forwardly, i.e., to the left as viewed in FIGS. 1 and 3, thus causing the O-ring 28 to become compressed between the enlarged head 52 and the internal rib 26, the O-ring thus establishing a fluid seal which normally prevents the flow of fluid through the valve casing 20. At such time as the valve stem 50 is forcibly shifted to the right against the yielding action of the spring 60, the O-ring 28 will be released from its binding or clamped relationship between the enlarged head 52 and the rib 26 so that it will become a free floating element and fluid will then be capable of flowing through the valve casing 20 from the inlet end to the discharge or outlet end thereof.

It is to be noted at this point that the enlarged head 52 of the valve stem 50 constitutes in effect a valve member proper, while the internal rib 26 and its associated O-ring 28 constitute in effect a seat for the valve member proper which is formed by head 52.

Considering now the extension line part 14 of the coupling 10, as previously stated this part is in the form of a nipple fitting and it includes a fitting casing or body 62 from which there projects axially away from the valve-equipped part 12 a reduced attachment stem 64 having formed therein an external screw thread 66 by means of which the extension line part 14 may be threadedly secured to the aforementioned flexible or other extension line. The reduced attachment stem establishes a central bore 68 which communicates with a counterbore 70 in the fitting casing or body, the two bores having an annular shoulder 72 between them. The counterbore 70 and the shoulder 72 together define a stem-receiving socket 74 (see FIG. 1) of which the shoulder 72 constitutes a bottom wall. The fitting body 62 is formed with an external or male screw thread 76 which is designed for cooperation with an internal or female screw thread 78 which is formed in the nipple cap member 42.

The nipple cap member 42 is in the form of a cup-shaped member which is designed for telescopic reception over the fitting body 62 by means of the aforementioned screw threads 76 and 78 and it is provided with an inturned annular flange 80 which bears against the external annular flange 40 on the valve body 20 and thus draws the latter axially toward the nipple fitting 14, i.e., the extension line coupling part when the nipple cap member is tightened.

In the actual use of the herein described automatic disconnect shut-off coupling 10 and as previously indicated, the pressure line part 12 will be permanently applied to the discharge or outlet end of a suitable fluid pressure line, the external screw thread 34 of the valve casing 20 being threadedly received in the internally threaded socket in a counterpart nipple fitting on said discharge or outlet end of the fluid pressure line. Similarly, the extension line part 14 will be permanently applied to a flexible or other extension line. Prior to coupling or application of the extension line part 14 to the fluid line part 12, the helical coil spring 60 will force the valve stem 50 to the left as viewed in FIG. 3 so that the O-ring 28 is compressed between the enlarged head 52 of the valve stem and the internal rib 26 of the valve casing 20 with the result that fluid under pressure within the pressure line may not flow through the valve casing 20. It is to be noted at this point that with the two coupling parts 12 and 14 poised in the manner in which they are illustrated in FIG. 3 preparatory to moving them axially toward each other for coupling purposes, the distance between the opposed open rims of the cup-shaped nipple cap member 42 and the fitting body of the extension line part 14 is appreciably less than the distance between the abutment pin 54 and the shoulder 72 which defines the bottom wall of the socket 74 in the extension line part 14. Thus, as said extension line part 14 is moved axially toward the pressure line part 12 for coupling purposes, the external screw thread 76 on the fitting body 62 of the extension line part will engage the internal screw thread 78 of the nipple cap member 42 before the abutment pin 54 engages the bottom wall of the socket 74. At such time as these screw threads 76 and 78 become engaged, an appreciable extent of the valve stem 50 will have been projected into the socket 74 and the O-ring 36 will have moved into sealing engagement with the inner cylindrical wall surface of said socket, such surface being established by the counterbore 70 in the fitting body 62 of the extension line part 14. However, the extent of projection of the valve stem 50 is not sufficiently great as to dislodge the valve stem 50 and move the enlarged head 52 out of clamping engagement with the O-ring 28. After such initial engagement between the screw threads 76 and 78, the nipple cap member 42 may be rotated throughout a relatively large number of turns in a counterclockwise direction as viewed in FIG. 2 before the fitting body 62 of the extension line part 14 is drawn in telescopic fashion over the discharge end of the valve casing 20 to such an extent that the abutment pin 54 will seat upon the shoulder 72 constituting the bottom wall of the socket 74 in said fitting body 62. This lost motion effect is significant in connection both with coupling or connecting of the parts 12 and 14 together and with uncoupling or disconnecting of such parts inasmuch as the valve stem 50 may not be shifted from the closed position of the valve until after an appreciable degree of threaded interlock takes place between the screw threads 76 and 78. Then, at such time as the shoulder 72 constituting the bottom wall of the socket 74 finally engages the abutment pin 54 to shift the valve stem 50 with respect to the valve casing 20 and rotation of the fitting 14 is continued, the valve stem 50 will commence to shift axially within the valve body 20 so as to release the O-ring from between the enlarged head 52 and the internal rib 26 to the end that fluid under pressure in the pressure line may pass through the annular rib 26 and thus flow through the valve body and enter the socket 74 and from thence into the bore 68 for flow into the extension line which is connected to the coupling part 14. As soon as the fluid enters the socket 74, it will be at least partially contained by the O-ring 36 which, at this time, is in sealing engagement with the smooth internal cylindrical wall surface of the socket 74. However, if the fluid pressure within the socket 74 is great there will be considerable back pressure on the casing 20 tending to "blow" the latter forcibly from the socket. This back pressure may exceed any manual pressure which could be applied to the body 20 of the pressure line part 12 tending to force the same to its coupling position and it also might result in some leakage of fluid around the O-ring 36. However, because with the present structure the screw threads 76 and 78 are appreciably mated with each other during such coupling of the two parts 12 and 14, the back pressure on the casing 20 is assimilated by the reaction force of the inturned annular flange 80 against the outwardly extending annular flange 40, and also any leakage of fluid past the O-ring 36 is contained by the interengaged screw threads 76 and 78. Continued rotation of the nipple cap member 42 in a tightening direction will continue to draw the two coupling parts 12 and 14 axially toward each other until the cap member is fully tightened, at which time the abutment pin 54 bears against the shoulder 72, the spring 60 is under compression, the O-ring 28 is in its freed condition, and the forward rim 32 of the valve casing 20 bears against the abutment pin 54, the parts assuming the position in which they are illustrated in FIG. 1.

During the disconnecting of the coupling parts 12 and 14, the nipple cap member 42 is rotated in a clockwise direction as viewed in FIG. 2 and an appreciable number of turns of the cap member is required before the abutment pin 54 leaves the shoulder 72. The pin 54 does not move away from the shoulder until the spring 60 has been expanded from its contracted condition to an extent sufficient to bring the enlarged head 52 of the valve stem into sealing engagement with the O-ring 28, thus compressing the same against the internal annular seating and sealing rib 26. Thereafter, several additional turns of the nipple cap member 42 are required before the latter is freed from the nipple body 62 of the extension line part 14. By such an arrangement, such fluid as enters the socket 74 before complete separation of the coupling parts 12 and 14 takes place is wholly contained within the confines ofthe partially threadedly connected nipple cap member 42 and nipple fitting 14. The shut-off function of the coupling part 12 is thus effective a short time prior to full uncoupling of the parts and, of course, it remains effective until the parts are again coupled.

The invention is not to be limited to the exact arrangement of parts shown in the accompanying drawings or described in this specification as various changes in the details of construction may be resorted to without departing from the spirit or scope of the invention. Therefore, only insofar as the invention is particularly pointed out in the accompanying claims is the same to be limited.

Having thus described the invention what I claim as new and desire to secure by letters patent is:

1. A two-part separable disconnect shut-off coupling adapted to establish end-to-end fluid communication between a fluid pressure line and a fluid extension line and comprising a first coupling part adapted to be operatively applied to said pressure line, and a second coupling part adapted to be operatively applied to said extension line, said first coupling part including an open-ended tubular generally cylindrical valve casing the rear end of which constitutes a fluid inlet and the forward end of which constitutes a fluid outlet, means on said casing for establishing fluid communication between said fluid inlet and said fluid pressure line, said valve casing being provided with an internal rearwardly facing annular valve seat, a valve member disposed within said valve casing rearwardly of said valve seat and movable axially toward and away from said seat between open and closed positions, and a valve stem on said valve member projecting forwardly through said valve seat and outwardly beyond the forward end of the valve casing, a helical compression spring surrounding said valve stem and effectively interposed between a forwardly facing shoulder on the valve casing and a rearwardly facing shoulder on the valve stem and serving yieldingly to bias said valve member and stem forwardly toward the closed position of the valve member, said second coupling part including a fitting casing defining a cylindrical socket designed for telescopic reception over the forward end of said valve casing, means on said fitting casing for establishing fluid communication between said socket and the extension line, interengaging means on the forward end of said valve stem and a wall of said socket and effective when a predetermined degree of telescopic reception of the forward end of the valve casing within the socket has been attained for moving the valve member into its open position, and a nipple cap member rotatably disposed on one of said casings and provided with an internal screw thread on one of the casings designed for threaded reception over an external screw thread on the other casing, said nipple cap member serving upon rotation thereof in a thread tightening direction to draw said coupling parts toward each other, the disposition of said screw threads on their respective casings being such that an appreciable degree of threaded engagement therebetween takes place prior to the time that said interengaging means on the valve stem and the wall of the socket become effective to move the valve member into its open position, said nipple cap member serving to contain any fluid which may escape from said forward end of the valve casing after said interengaging means has become thus effective.

2. A two-part separable disconnect shut-off coupling as set forth in claim 1 and wherein said nipple cap member is rotatably disposed on said valve casing.

3. A two-part separable disconnect shut-off coupling as set forth in claim 1 and wherein said valve seat is established by means of an internal annular rib within said valve casing, and said spring means comprises a helical compression spring surrounding the valve stem and bearing at its rear end against said rib and at its forward end against a rearwardly facing shoulder on the forward end of said valve stem.

4. A two-part separable disconnect shut-off coupling as set forth in claim 3 and wherein said rearwardly facing shoulder on the forward end of said valve stem is established by the provision of an abutment pin which projects diametrically through the forward end region of the valve stem.

5. A two-part separable disconnect shut-off coupling as set forth in claim 4 and wherein said means on the fitting casing for establishing fluid communication between the socket and the extension line includes an attachment stem which projects forwardly of the fitting casing and is provided with an axial bore which communicates with the socket through an opening in the bottom wall of the latter, and said interengaging means embodies said abutment pin and the rear rim region of said bore.

6. A two-part separable disconnect shut-off valve as set forth in claim 4 and wherein said valve seat embodies an elastomeric O-ring which is interposed between said annular rib of the valve casing and said valve member.

7. A two-part separable disconnect shut-off valve as set forth in claim 6 and wherein a second elastomeric O-ring is interposed between the wall of the cylindrical socket and the tubular cylindrical valve casing.

* * * * *